US012683249B2

(12) United States Patent
Ohira et al.

(10) Patent No.: US 12,683,249 B2
(45) Date of Patent: Jul. 14, 2026

(54) ELECTRICITY STORAGE MODULE

(71) Applicants: TOYOTA JIDOSHA KABUSHIKI KAISHA, Toyota (JP); Mektec Corporation, Tokyo (JP)

(72) Inventors: Yuki Ohira, Nisshin (JP); Satoshi Tabara, Miyoshi (JP); Shunsuke Tomita, Minato-ku (JP); Tsukasa Watanabe, Minato-ku (JP)

(73) Assignees: TOYOTA JIDOSHA KABUSHIKI KAISHA, Toyota (JP); MEKTEC CORPORATION, Tokyo (JP)

( * ) Notice: Subject to any disclaimer, the term of this patent is extended or adjusted under 35 U.S.C. 154(b) by 840 days.

(21) Appl. No.: 18/102,441

(22) Filed: Jan. 27, 2023

(65) Prior Publication Data

US 2023/0246303 A1     Aug. 3, 2023

(30) Foreign Application Priority Data

Feb. 1, 2022     (JP) ................................. 2022-014296

(51) Int. Cl.
H01M 50/507     (2021.01)
H01M 50/202     (2021.01)

(52) U.S. Cl.
CPC ....... H01M 50/507 (2021.01); H01M 50/202 (2021.01)

(58) Field of Classification Search
CPC ............. H01M 50/507; H01M 50/202; H01M 50/264; H01M 50/291; H01M 50/293; H01M 50/503; H01M 50/51; H01M 50/516; H01M 50/55; H01M 2220/20; H01M 50/209; H01M 50/258; H01M 50/244; H01M 40/289; H01M 50/502; Y02E 60/10
See application file for complete search history.

(56) References Cited

U.S. PATENT DOCUMENTS

2014/0335393 A1     11/2014  Wada et al.
2018/0151859 A1*     5/2018  Aizawa ............... H01M 50/505
2022/0045396 A1*     2/2022  Tomita ................ H01M 50/209

FOREIGN PATENT DOCUMENTS

| CN | 112640189 A | 4/2021 | |
| JP | 2014-232633 A | 12/2014 | |
| JP | 2017-212128 | * 11/2017 | .............. H01M 2/20 |
| JP | 2020-087607 A | 6/2020 | |
| WO | 2017/006763 A1 | 1/2017 | |

OTHER PUBLICATIONS

JP 2017-212128 machine English translation (Year: 2017).*

* cited by examiner

Primary Examiner — Michael L Dignan
(74) Attorney, Agent, or Firm — Sughrue Mion, PLLC

(57)     ABSTRACT

An electricity storage module includes a plurality of electricity storage cells, a plurality of resin frames, and a bus bar module. Each of the electricity storage cells includes a pair of external terminals. The bus bar module includes a plurality of bus bars and a bus bar case. The resin frame includes a retaining portion configured to retain the bus bar case. The bus bar case includes a retained portion that is configured to engage with the retaining portion, and a biasing portion that is configured to bias the bus bar toward a side of the retained portion, in a state in which the retained portion is engaged with the retaining portion.

4 Claims, 5 Drawing Sheets

WIDTH DIRECTION

ONE DIRECTION

ELECTRICITY STORAGE MODULE

CROSS-REFERENCE TO RELATED APPLICATION

This application claims priority to Japanese Patent Application No. 2022-014296 filed on Feb. 1, 2022, incorporated herein by reference in its entirety.

BACKGROUND

1. Technical Field

The present disclosure relates to an electricity storage module.

2. Description of Related Art

For example, Japanese Unexamined Patent Application Publication No. 2014-232633 (JP 2014-232633 A) discloses an electric power supply device including a plurality of batteries and a bus bar module. The bus bar module has a plurality of bus bars connecting external terminals of a pair of the batteries adjacent to each other, and a case accommodating the bus bars. The case has a peripheral wall that accommodates the bus bars and an elastic portion. The elastic portion positions the bus bars at predetermined positions separated from the peripheral wall, in a state of gripping the bus bars.

SUMMARY

In the electric power supply device disclosed in JP 2014-232633 A, when deviation of attachment positions of the bus bar module becomes relatively great with respect to the batteries, relative displacement of the bus bars with respect to the bus bar case may not be sufficient to accommodate the deviation in some cases.

The present disclosure provides an electricity storage module enhancing positioning precision in a bus bar case with respect to a plurality of electricity storage cells.

An electricity storage module provided by an aspect of the present disclosure includes a plurality of electricity storage cells disposed arrayed in one direction, a plurality of resin frames each being disposed between a pair of the electricity storage cells adjacent to each other in the one direction, and a bus bar module disposed on the electricity storage cells and the resin frames. Each of the electricity storage cells includes a pair of external terminals, the bus bar module includes a plurality of bus bars configured to electrically connect the external terminals adjacent to each other in the one direction, and a bus bar case configured to hold the bus bars, the resin frame includes a retaining portion configured to retain the bus bar case, and the bus bar case includes a retained portion that is engage with the retaining portion, and a biasing portion configured to bias the bus bar toward a side of the retained portion, in a state in which the retained portion is engaged with the retaining portion.

According to the present disclosure, an electricity storage module enhancing positioning precision in a bus bar case with respect to a plurality of electricity storage cells can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
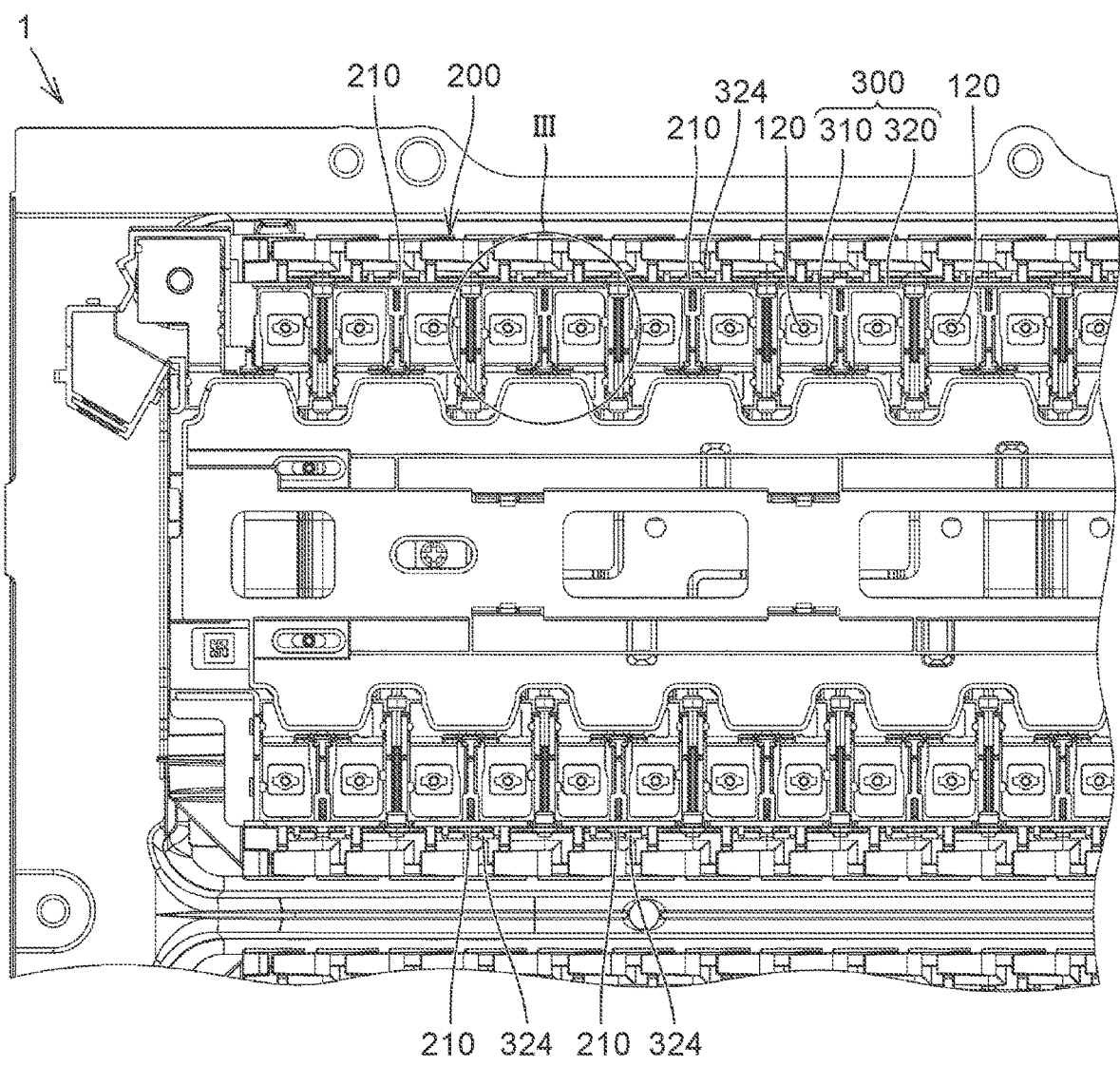
FIG. 1 is a plan view schematically illustrating part of an electricity storage module according to an embodiment of the present disclosure.

An embodiment of the present disclosure will be described with reference to the drawings. Note that in the drawings referred to below, members that are the same or equivalent thereto are denoted by the same signs.

Figure 2:
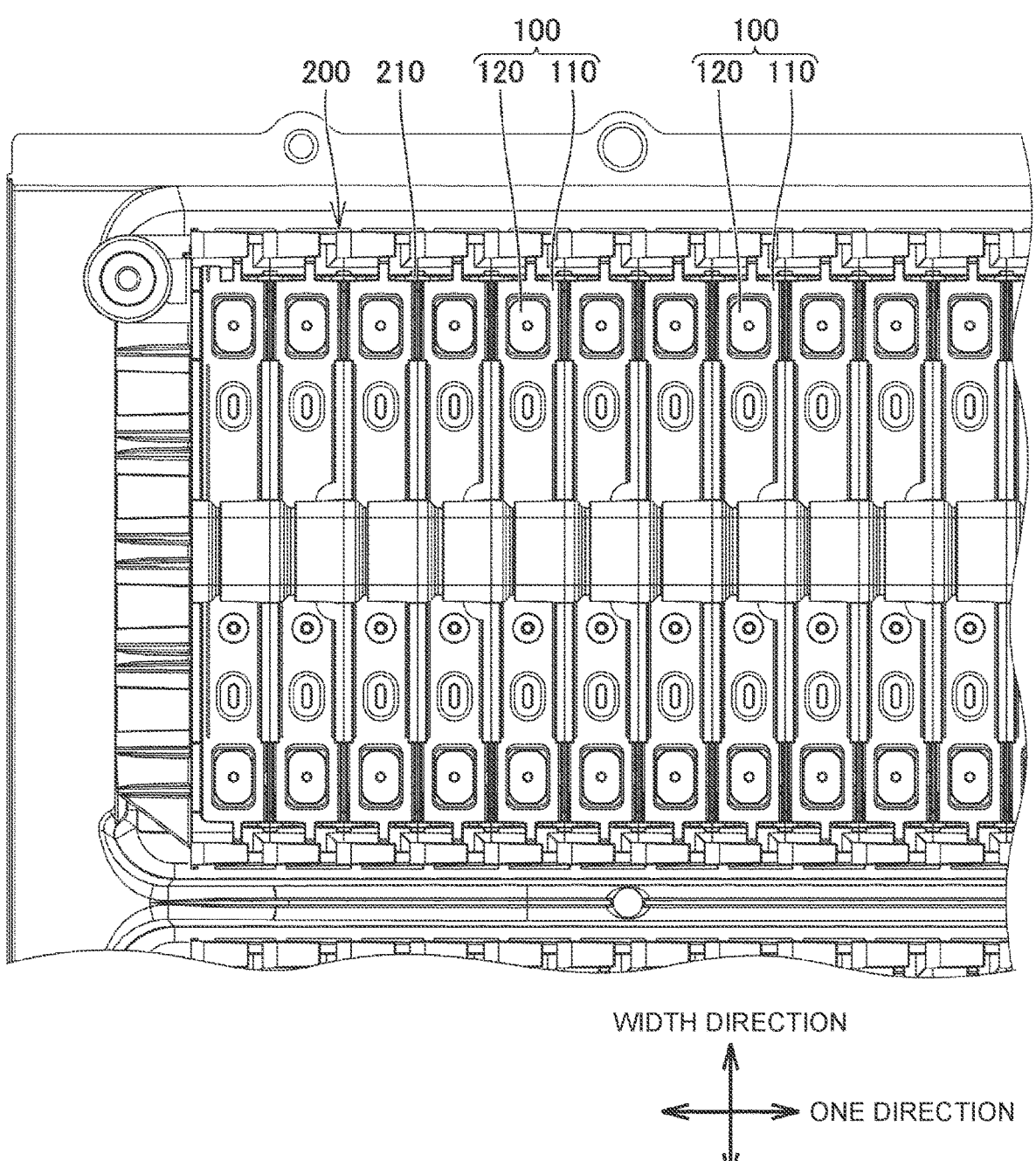
FIG. 2 is a plan view of a plurality of electricity storage cells and a plurality of resin frames.

FIG. 1 is a plan view schematically illustrating part of an electricity storage module according to the embodiment of the present disclosure. FIG. 2 is a plan view of a plurality of electricity storage cells and a plurality of resin frames. This electricity storage module 1 is installed in a vehicle, for example.

As illustrated in FIGS. 1 and 2, the electricity storage module 1 includes a plurality of electricity storage cells 100, a plurality of resin frames 200, and a bus bar module 300.

As illustrated in FIG. 2, the electricity storage cells 100 are disposed arrayed in one direction. Examples of the electricity storage cells 100 include lithium-ion batteries. Each electricity storage cell 100 has a case 110 and a pair of external terminals 120.

The case 110 accommodates electrodes and so forth. The case 110 is made of aluminum or the like. The case 110 has a cuboid shape.

The external terminals 120 have shapes that protrude from the case 110. Each external terminal 120 protrudes upward from an upper face of the case 110. One of the external terminals 120 is a positive electrode terminal and the other is a negative electrode terminal. Note that a safety valve (omitted from illustration) is provided at a portion of the case 110 between the external terminals 120.

Each electricity storage cell 100 may be a battery having a liquid electrolyte accommodated in the case 110 or may be a battery having a solid electrolyte accommodated in the case 110 (all-solid-state battery).

Each resin frame 200 is disposed between a pair of the electricity storage cells 100 adjacent to each other in the one direction. Each resin frame 200 has a retaining portion 210 that is capable of retaining the bus bar module 300. The retaining portion 210 is provided on an upper portion of the resin frame 200. In the present embodiment, the retaining portion 210 is made up of a claw portion that has a shape protruding toward an outer side in a width direction that is orthogonal to both the one direction and an up-down direction. The retaining portion 210 is provided on an outer side of the external terminal 120 in the width direction. Thus, a smoke exhaust path from the safety valve of the case 110 is secured.

As illustrated in FIG. 1, the bus bar module 300 is disposed on the electricity storage cells 100 and the resin frames 200. The bus bar module 300 has a plurality of bus bars 310 and a bus bar case 320.

Figure 3:
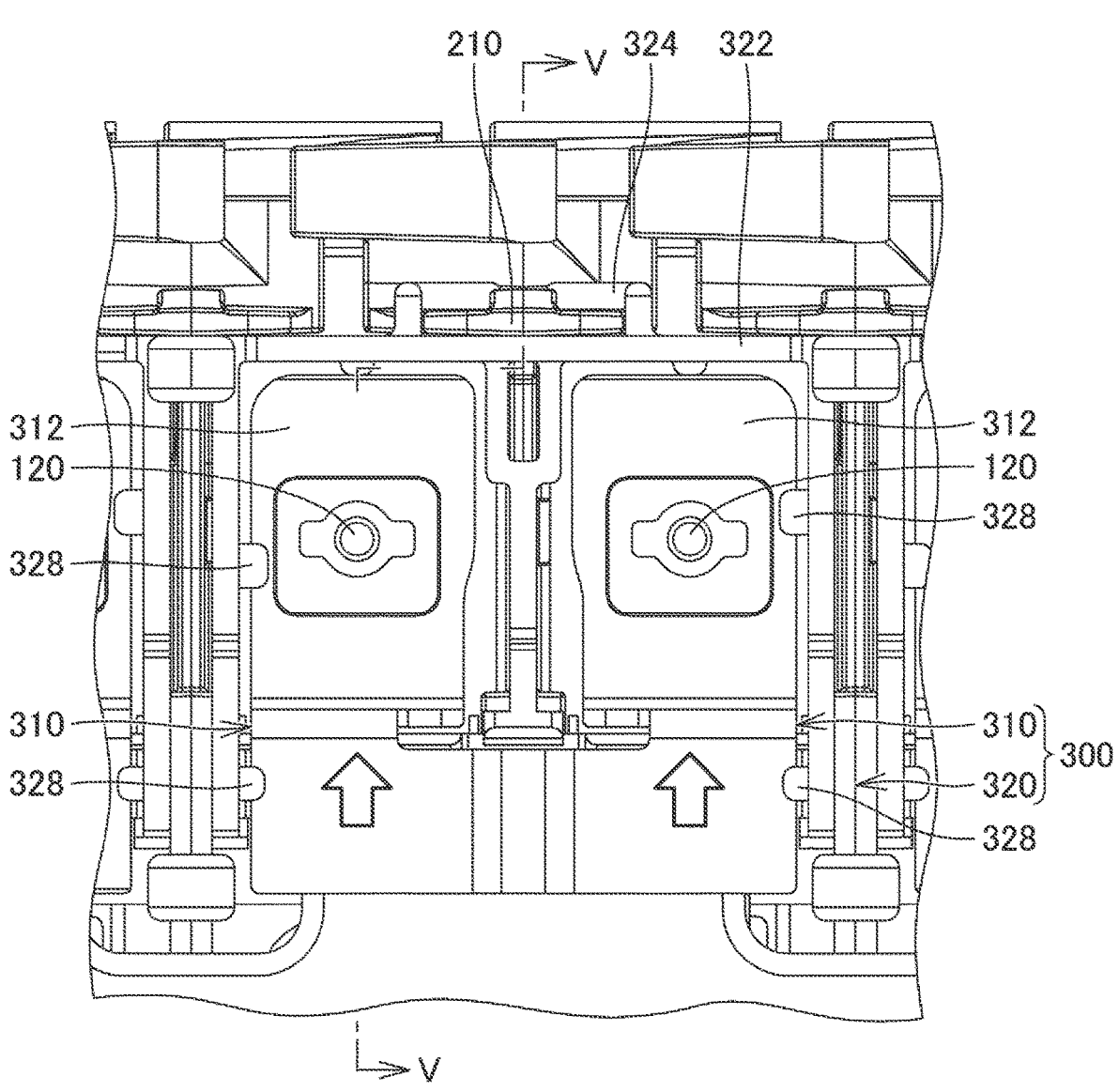
FIG. 3 is an enlarged view of the range indicated by continuous line III in FIG. 1.

As illustrated in FIG. 3, each bus bar 310 electrically connects the external terminals 120 that are adjacent to each other in the one direction. Each bus bar 310 electrically connects the positive electrode terminal of one electricity storage cell 100 and the negative electrode terminal of the electricity storage cell 100 adjacent to the one electricity storage cell 100. That is to say, the electricity storage cells 100 are connected in series by the bus bars 310.

Figure 4:
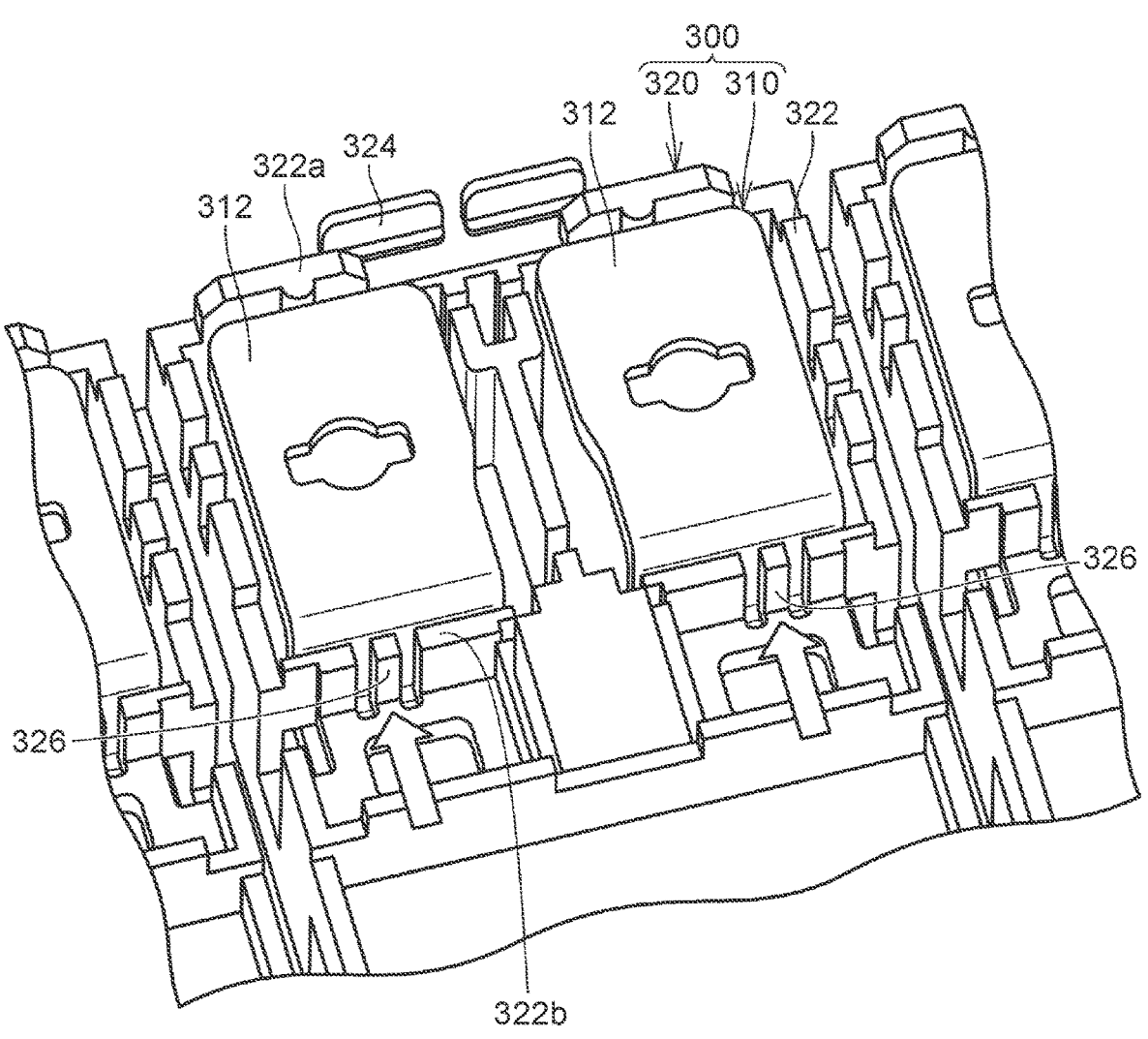
FIG. 4 is a perspective view from below a bus bar module.
Figure 5:
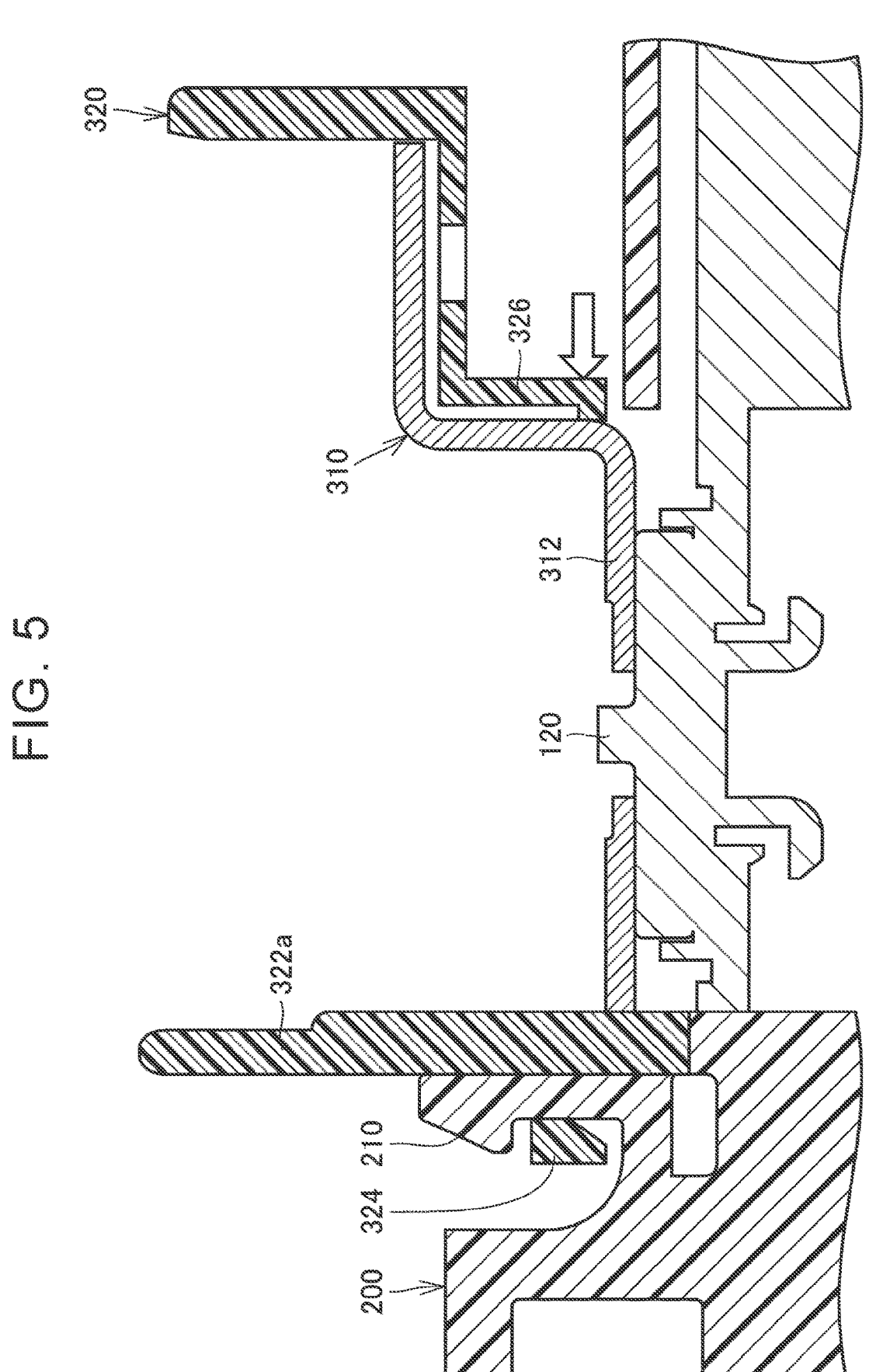
FIG. 5 is a cross-sectional view taken along line V-V in FIG. 3.

As illustrated in FIGS. 3 to 5, each bus bar 310 has a welded portion 312 that is welded to the external terminal 120. The welded portion 312 has a flat plate shape. A through hole that exposes a portion of the external terminal 120 is provided in the welded portion 312.

The bus bar case 320 holds the bus bars 310. The bus bar case 320 is made of an insulating material (synthetic resin or the like). As illustrated in FIGS. 3 to 5, the bus bar case 320 has an accommodating portion 322, a retained portion 324, a biasing portion 326, and a plurality of lock portions 328 (four lock portions 328 in the present embodiment).

The accommodating portion 322 accommodates the welded portion 312. The accommodating portion 322 has a square tube shape. As illustrated in FIG. 4, the accommodating portion 322 has an outer wall 322a that is provided on the outer side in the width direction and an inner wall 322b that is provided on an inner side in the width direction. The outer wall 322a and the inner wall 322b face each other in the width direction.

The retained portion 324 is capable of being engaged with the retaining portion 210 of the resin frame 200. The retained portion 324 protrudes outward in the width direction from the accommodating portion 322. A gap is provided between the retained portion 324 and the outer wall 322a of the accommodating portion 322 so as to allow the retaining portion 210 to pass therethrough.

As illustrated in FIG. 1, a plurality of the retained portions 324 is disposed arrayed in a staggered pattern in plan view. That is to say, the retained portions 324 are disposed such that a position at which a retained portion 324 engages, out of a pair of the retaining portions 210 of one resin frame 200, a retaining portion 210 provided on one side in the width direction, and a position at which another retained portion 324 engages, out of the retaining portions 210 of another resin frame 200 that is adjacent to the one resin frame 200, a retaining portion 210 provided on another side in the width direction. The retained portions 324 are disposed so as to be arrayed alternately along the one direction.

The biasing portion 326 biases the bus bar 310 toward the retained portion 324 side (outer side in the width direction), in a state in which the retained portion 324 is engaged with the retaining portion 210. More specifically, as indicated by arrows in FIGS. 4 and 5, the biasing portion 326 biases the bus bar 310 from the inner wall 322b toward the outer wall 322a. As illustrated in FIG. 4, the biasing portion 326 is made up of a portion that is situated between a pair of slits provided in the inner wall 322b.

Each lock portion 328 is provided on an inner face of the accommodating portion 322. Each lock portion 328 restrains the bus bar 310 biased by the biasing portion 326 from rotating within the accommodating portion 322. Each lock portion 328 has a function of centering the bus bar 310 within the accommodating portion 322. Each lock portion 328 has a snap-fit structure, for example.

As described above, in the electricity storage module according to the present embodiment, the resin frames 200 have the retaining portions 210 and the bus bar cases 320 have the retained portions 324, so that the positioning precision of the bus bar module 300 with respect to the electricity storage cells 100 is enhanced. Furthermore, the bus bar case 320 includes the biasing portion 326, and accordingly the positional precision of each bus bar 310 with respect to the bus bar case 320 is enhanced.

It will be appreciated by those skilled in the art that the exemplary embodiment described above is a specific example of the following aspect.

The electricity storage module in the above embodiment includes a plurality of electricity storage cells disposed arrayed in one direction, a plurality of resin frames disposed between a pair of the electricity storage cells adjacent to each other in the one direction, and a bus bar module disposed on the electricity storage cells and the resin frames, in which each of the electricity storage cells includes a pair of external terminals, the bus bar module includes a plurality of bus bars configured to electrically connect the external terminals adjacent to each other in the one direction, and a bus bar case configured to hold the bus bars, each of the resin frames includes a retaining portion configured to retain the bus bar case, and the bus bar case includes a retained portion that is engage with the retaining portion, and a biasing portion configured to bias the bus bar toward a side of the retained portion, in a state in which the retained portion is engaged with the retaining portion.

According to this electricity storage module, the resin frames have the retaining portions and the bus bar cases have the retained portions, and accordingly the positioning precision of the bus bar module with respect to the electricity storage cells is enhanced. Further, the bus bar case has the biasing portion, and accordingly the positional precision of each bus bar with respect to the bus bar case is enhanced.

It should be noted that the embodiment disclosed herein is exemplary in all respects and not restrictive. The scope of the disclosure is defined by the claims rather than by the above description of the embodiment, and is intended to include all modifications within the meaning and scope equivalent to those of the claims.

What is claimed is:

1. An electricity storage module comprising:
   a plurality of electricity storage cells disposed so as to be arrayed in one direction;
   a plurality of resin frames each being disposed between a pair of the electricity storage cells adjacent to each other in the one direction; and
   a bus bar module disposed on the electricity storage cells and the resin frames, wherein
   each of the electricity storage cells includes a pair of external terminals that are separated from each other in a width direction orthogonal to the one direction,
   the bus bar module includes
      a plurality of bus bars configured to electrically connect the external terminals adjacent to each other in the one direction, and
      a bus bar case configured to hold the bus bars,
   each of the resin frames includes a retaining portion configured to retain the bus bar case, and
   the bus bar case includes
      an accommodating portion having a square tube shape defining an outer wall on an outer side in the width direction and an inner wall on an inner side in the width direction, wherein the accommodating portion accommodates a bus bar between the inner wall and the outer wall,
      a retained portion that is configured to engage with the retaining portion, and
      a biasing portion defined by a pair of slits in the inner wall accommodating the bus bar and configured to bias the bus bar toward a side of the retained portion by contacting a side of the bus bar facing along the width direction, in a state in which the retained portion is engaged with the retaining portion.

2. The electricity storage module of claim 1, wherein each of the plurality of bus bars comprises a welded portion having a flat plate shape that is welded to one of the external terminals, and a vertical wall extending from the flat plate shape in a direction perpendicular to the one direction and the width direction and facing the width direction, the accommodating portion accommodates the bus bars between the inner wall and the outer wall in a state in which the inner wall corresponds to the vertical wall of the bus bars, and the biasing portion is configured to bias the bus bar toward the side of the retained portion by contacting the vertical wall of the bus bar, in the state in which the retained portion is engaged with the retaining portion.

3. The electricity storage module of claim 1, wherein the accommodating portion has a pair of side walls extending along the width direction between the outer wall and the inner wall, and the accommodating portion accommodates the plurality of bus bars between the outer wall, the inner wall, and the pair of side walls, and the bus bar case further includes a plurality of locking portions protruding in the one direction from an inner surface of each of the pair of side walls and configured to restrain the bus bars.

4. The electricity storage module of claim 1, wherein the retained portion is protruding outward in the width direction from an outer side of the outer wall of the accommodating portion so as to form a gap between the retained portion and the outer wall, and the retained portion is configured to engage with the retaining portion by receiving the retaining portion in the gap.

\* \* \* \* \*